United States Patent
Shinto

(10) Patent No.: US 9,509,878 B2
(45) Date of Patent: Nov. 29, 2016

(54) IMAGE PROCESSING APPARATUS AND METHOD FOR CONTROLLING THE SAME, AND STORAGE MEDIUM

(71) Applicant: CANON KABUSHIKI KAISHA, Tokyo (JP)

(72) Inventor: Yasushi Shinto, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/625,105

(22) Filed: Feb. 18, 2015

(65) Prior Publication Data

US 2015/0256687 A1    Sep. 10, 2015

(30) Foreign Application Priority Data

Mar. 4, 2014   (JP) .................................. 2014-041941

(51) Int. Cl.
  *G06F 3/12*    (2006.01)
  *H04N 1/00*    (2006.01)
  *G06K 15/02*   (2006.01)

(52) U.S. Cl.
  CPC .......... *H04N 1/0083* (2013.01); *G06F 3/1213* (2013.01); *G06F 3/1229* (2013.01); *G06F 3/1285* (2013.01); *G06F 3/1258* (2013.01); *H04N 2201/0094* (2013.01)

(58) Field of Classification Search
  None
  See application file for complete search history.

(56) References Cited

U.S. PATENT DOCUMENTS

| 6,819,453 | B1 * | 11/2004 | Suzuki | G06T 5/20 358/1.9 |
|---|---|---|---|---|
| 7,495,970 | B1 * | 2/2009 | Tang | G11C 29/028 326/39 |
| 7,669,035 | B2 * | 2/2010 | Young | G06F 13/4265 710/104 |
| 8,482,748 | B2 * | 7/2013 | Hara | G03G 15/5087 358/1.13 |
| 8,508,758 | B2 * | 8/2013 | Hara | G06F 3/1211 358/1.1 |
| 8,514,441 | B2 | 8/2013 | Shinto | 358/1.16 |
| 2001/0010074 | A1 * | 7/2001 | Nishihara | G06F 9/325 712/227 |

(Continued)

FOREIGN PATENT DOCUMENTS

JP      2011-186981 A      9/2011
JP      2014-165803    *   9/2014 .......... H03K 19/173

*Primary Examiner* — Beniyam Menberu
(74) *Attorney, Agent, or Firm* — Fitzpatrick, Cella, Harper & Scinto

(57) ABSTRACT

An image processing apparatus performs control so as to reconfigure an image processing unit that performs an image process and that is provided in a portion of a dynamic reconfiguration unit that can dynamically reconfigure a portion of circuit arrangement. The image processing apparatus divides the image processing unit into a parameter holding unit that holds parameters for an image process and an image data processing unit that performs an image process on image data in accordance with the parameters held by the parameter holding unit, performs control so as to reconfigure the image data processing unit after the parameter holding unit is reconfigured, and sets parameters for an image process in the parameter holding unit when reconfiguration of the parameter holding unit has been completed.

8 Claims, 9 Drawing Sheets

(56) References Cited

U.S. PATENT DOCUMENTS

| | | | | |
|---|---|---|---|---|
| 2004/0255105 A1* | 12/2004 | Chung | G06F 9/3851 | 713/1 |
| 2005/0062993 A1* | 3/2005 | Hayaishi | H04N 1/407 | 358/1.9 |
| 2008/0285797 A1* | 11/2008 | Hammadou | G06K 9/00771 | 382/103 |
| 2010/0225948 A1* | 9/2010 | Sato | H04N 1/00965 | 358/1.13 |
| 2010/0245878 A1* | 9/2010 | Yamada | H04N 1/0096 | 358/1.13 |
| 2011/0109931 A1* | 5/2011 | Nomura | H04N 1/0097 | 358/1.13 |
| 2011/0216247 A1* | 9/2011 | Nishida | H03K 19/17756 | 348/725 |
| 2011/0225415 A1* | 9/2011 | Yamada | H03K 19/17752 | 713/100 |
| 2011/0231640 A1* | 9/2011 | Avadhanam | G06F 9/4403 | 713/2 |
| 2011/0235078 A1* | 9/2011 | Hara | G06F 3/1211 | 358/1.13 |
| 2012/0105884 A1* | 5/2012 | Matsumura | G06F 9/445 | 358/1.13 |
| 2014/0244981 A1* | 8/2014 | Okada | G06F 15/7867 | 712/220 |

* cited by examiner

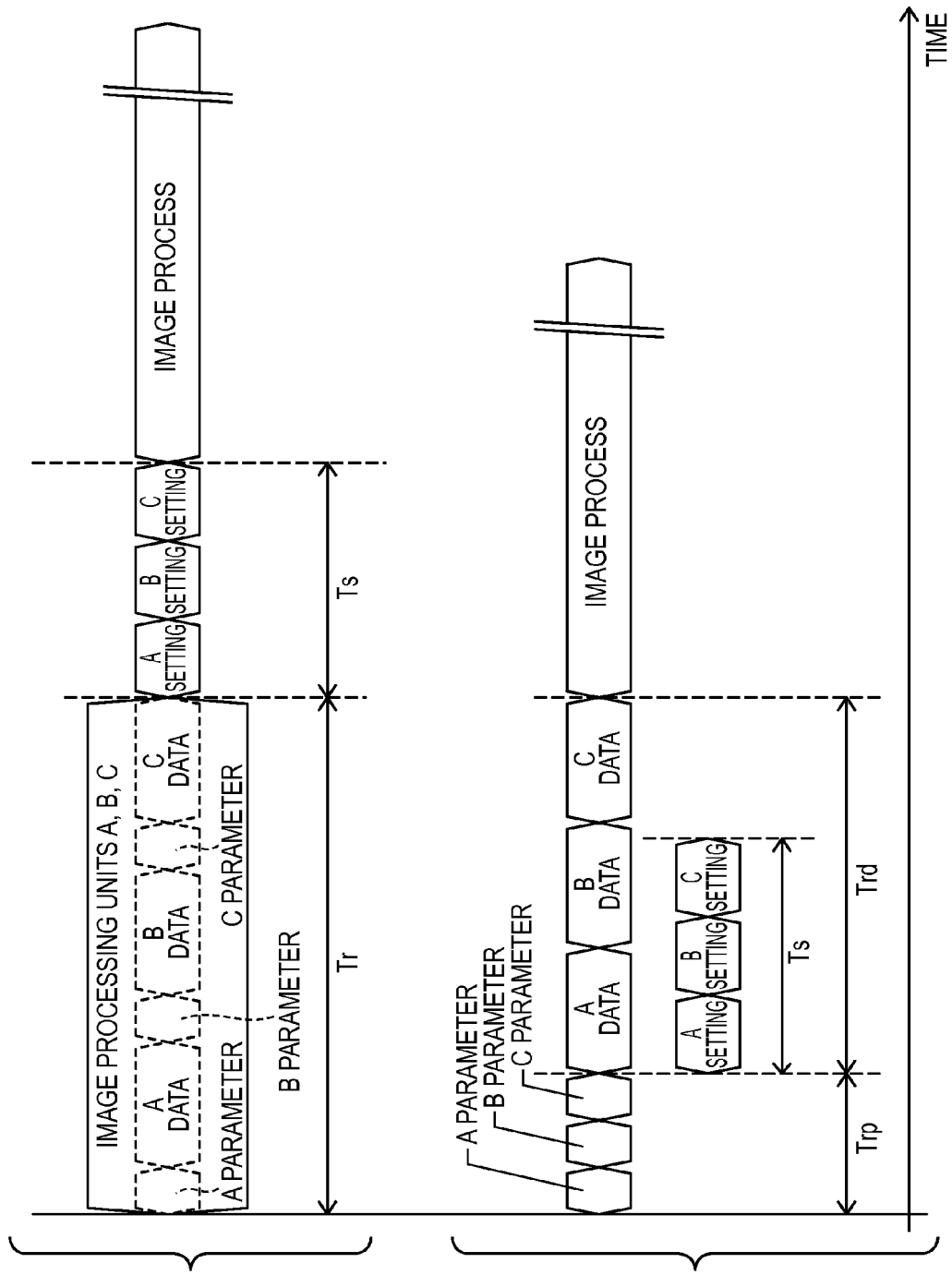

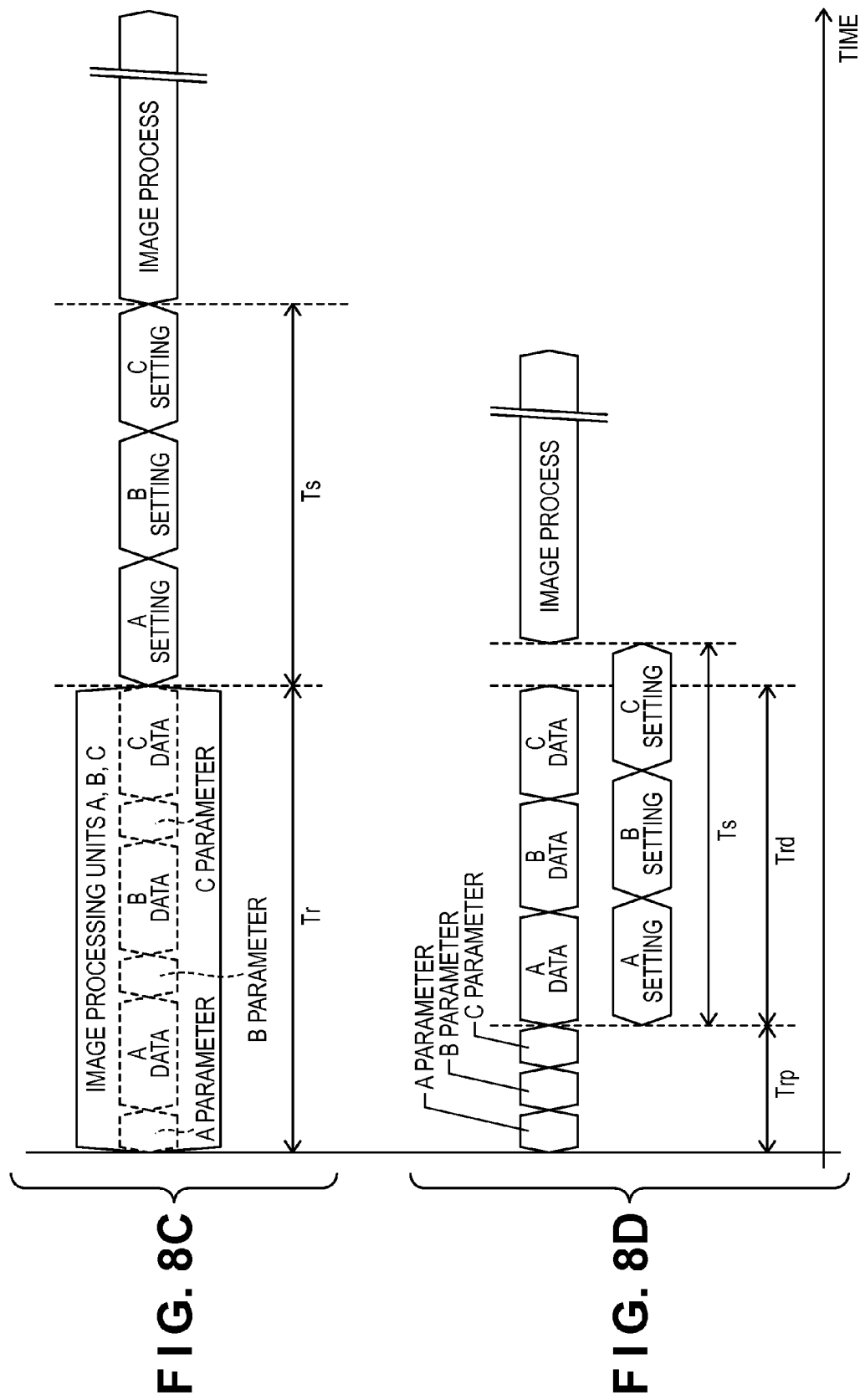

IMAGE PROCESSING APPARATUS AND METHOD FOR CONTROLLING THE SAME, AND STORAGE MEDIUM

BACKGROUND OF THE INVENTION

Field of the Invention

The present invention relates to an image processing apparatus and a method for controlling the same, and a storage medium.

Description of the Related Art

Reconfigurable circuits such as a PLD (Programmable Logic Device), FPGA (Field Programmable Gate Array) and the like that have changeable logic circuit arrangements are well known. Typically, change of logic circuits of a PLD or an FPGA can be realized by, at the time of power activation, writing circuit configuration information stored in a non-volatile memory such as a ROM or the like in a configuration memory, which is a volatile memory inside the PLD or the FPGA. Also, because information in a configuration memory is cleared at the time of shutting down the power, it is necessary to again write the circuit configuration information that is stored in the ROM, to the configuration memory when the power is turned on. A method for configuring logic circuits of a PLD or an FPGA once in a state in which the power is supplied in this manner is called static reconfiguration. In contrast, an FPGA and the like whose logic circuit arrangement can be dynamically changed while the logic circuit is operating have been developed, and a method for dynamically changing logic circuits in this manner is called dynamic reconfiguration.

Also, there is an FPGA in which a circuit arrangement in a specific region can be rewritten instead of rewriting the circuit arrangement of the entire FPGA tip, and such rewriting is called partial reconfiguration. In particular, the changing of a circuit arrangement of a circuit other than operating circuits without stopping the operations thereof is called dynamic partial reconfiguration. In dynamic partial reconfiguration, logic circuits of an FPGA can be partially reconfigured by rewriting only a partial region of the configuration memory at the time of dynamic reconfiguration instead of rewriting the entire configuration memory. It is possible to implement a plurality of logic circuits that are switched in a time-sharing manner in a given region of an FPGA, for example, by using such a dynamic partial configuration. As a result, application-specific functions can be flexibly realized with limited hardware resources while keeping high-speed operation performance of hardware.

Such FPGAs whose circuit arrangement can be dynamically changed (rewritten) require a long time for rewriting the circuit arrangement, and the time is proportional to the size of the circuit configuration information that is to be written in the configuration memory. Therefore, conventionally, a technique has been proposed in order to reduce the time required to rewrite a circuit arrangement. For example, Japanese Patent Laid-Open No. 2011-186981 proposes a technique in which on a reconfigurable circuit, when a plurality of partial circuits that constitute a pipeline that executes data processing in order are reconfigured, reconfiguration is performed in order beginning with the first partial circuit in the pipeline, and the reconfigured partial circuits are started in order. Accordingly, higher-speed data processing is realized than with a method for reconfiguring and starting reconfigurable circuits altogether at the same time on the reconfigurable circuit.

Also, image processing apparatuses such as an MFP (Multi Function Printer) and the like execute image processes that are selected in accordance with a request from a user, from among a plurality of executable processes (a copy job, a print job, a send job and the like). Each image process is realized by hardware or software. Typically, operations and process content to be performed by hardware logic circuits when required to realize each image process are set by parameters given for the logic circuits.

In an image processing apparatus that includes a reconfigurable circuit in which a plurality of partial circuits can be dynamically reconfigured in a pipeline configuration, in the case where each of the plurality of partial circuits is reconfigured as a circuit (an image processing unit) that executes a separate image process, the following issues arise. In such image processing apparatuses, for each of a plurality of image processing units, parameters for determining operations and process content of the image processing unit need to be set for the image processing unit after reconfiguration of the image processing unit has been completed. Thus, even if reconfiguration and startup of the image processing unit have been completed, an image process cannot be initiated until the setting of parameters is completed. Therefore, in such image processing apparatuses, in order to allow an image process to be initiated sooner after the image processing unit is reconfigured, it is necessary to shorten the time required to set parameters for the image processing unit.

SUMMARY OF THE INVENTION

The present invention has been made in view of the above described issues. The present invention provides a technique for enabling, in an image processing apparatus that performs an image process by a dynamic partial reconfigurable circuit, the image process to be initiated sooner after the circuit has been reconfigured.

According to one aspect of the present invention, there is provided an image processing apparatus comprising: a reconfigurable circuit on which a plurality of logic circuits are configured dynamically; a configuration controller configured to initiate a configuration of a first logic circuit on the reconfigurable circuit, and initiate, after the initiation of the configuration of the first logic circuit, a configuration of a second logic circuit on the reconfigurable circuit; and a setting controller configured to set a parameter in the configured first logic circuit, before completion of the configuration of the second logic circuit, wherein the parameter set in the configured first logic circuit is to be used for an image process which is performed by the second logic circuit.

According to another aspect of the present invention, there is provided a method for controlling an image processing apparatus which includes a reconfigurable circuit on which a plurality of logic circuits are configured dynamically, the method comprising: initiating a configuration of a first logic circuit on the reconfigurable circuit; initiating, after the initiation of the configuration of the first logic circuit, a configuration of a second logic circuit on the reconfigurable circuit; and setting a parameter in the configured first logic circuit, before completion of the configuration of the second logic circuit, wherein the parameter set in the configured first logic circuit is to be used for an image process which is performed by the second logic circuit.

According to still another aspect of the present invention, there is provided a non-transitory computer-readable storage medium storing a computer program for causing a computer to execute steps of a method for controlling an image processing apparatus which includes a reconfigurable circuit on which a plurality of logic circuits are configured dynamically, the method comprising: initiating a configuration of a first logic circuit on the reconfigurable circuit; initiating, after the initiation of the configuration of the first logic circuit, a configuration of a second logic circuit on the reconfigurable circuit; and setting a parameter in the configured first logic circuit, before completion of the configuration of the second logic circuit, wherein the parameter set in the configured first logic circuit is to be used for an image process which is performed by the second logic circuit.

According to the present invention, in an image processing apparatus that performs an image process by a dynamic partial reconfigurable circuit, the image process can be initiated sooner after the circuit has been reconfigured.

Further features of the present invention will become apparent from the following description of exemplary embodiments with reference to the attached drawings.

BRIEF DESCRIPTION OF THE DRAWINGS

FIGS. 8A to 8D are timing charts indicating an example of timing when a dynamic reconfiguration unit is reconfigured and parameters are set.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Configuration of Image Processing Apparatus

Figure 1:
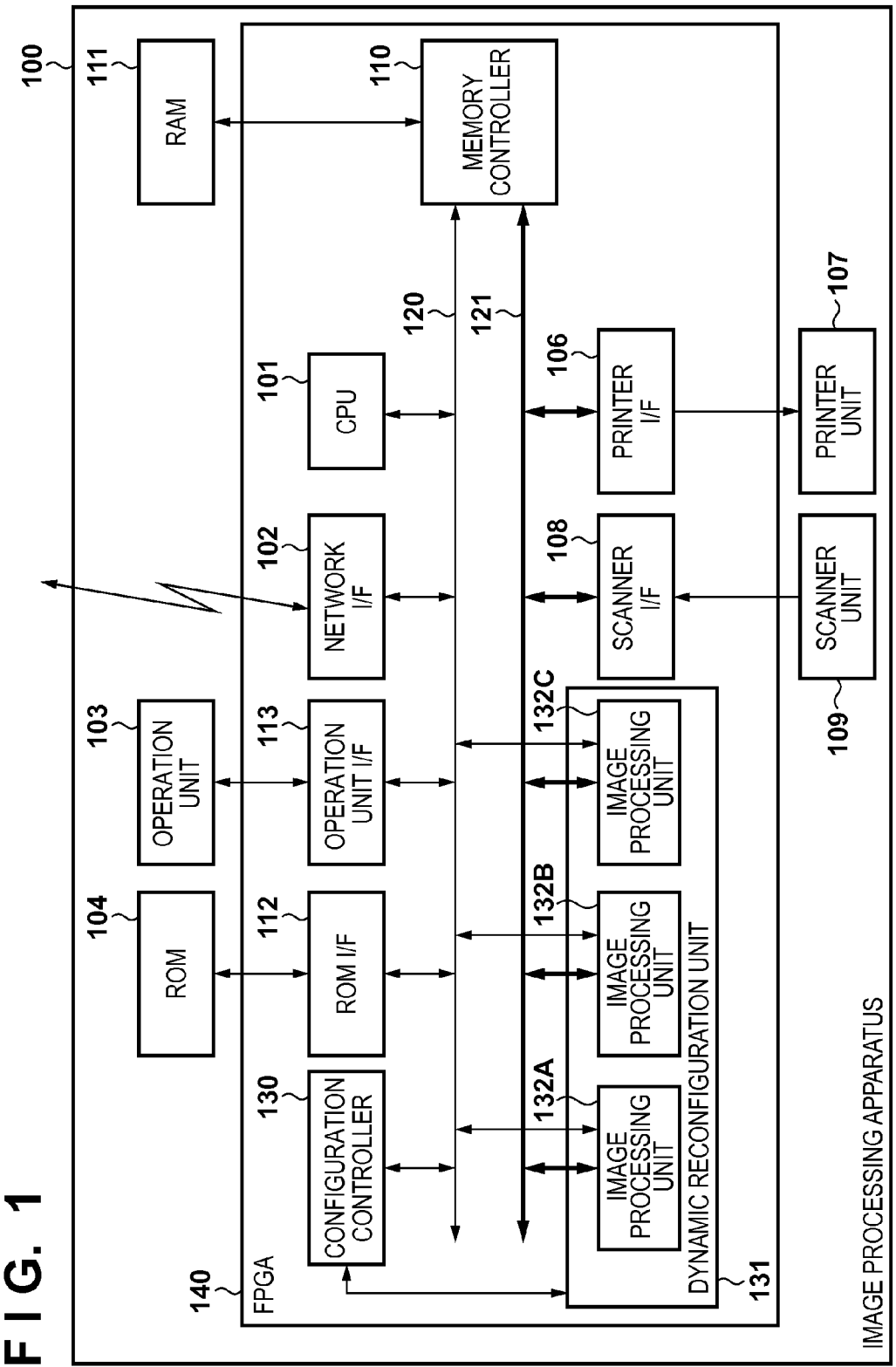
FIG. 1 is a diagram showing an example of the configuration of an image processing apparatus according to one embodiment.

FIG. 1 is a block diagram showing an example of the configuration of an image processing apparatus 100 according to an embodiment of the present invention. It should be noted that the present embodiment describes a case in which the image processing apparatus 100 is a multi-function printer (a multi-function peripheral) that has a scanner unit and a printer unit, as an example.

The image processing apparatus 100 has an operation unit 103 for a user who uses the image processing apparatus 100 to perform various operations, a scanner unit 109 that reads image information of a document, and a printer unit 107 that prints an image on a sheet based on image data. The scanner unit 109 has a CPU (not shown) that controls the scanner unit 109, an illumination lamp and a scan mirror (both are not shown) for reading a document, and the like. The printer 107 has a CPU (not shown) that controls the printer unit 107, a photosensitive dram and a fixing device (bot are not shown) for forming (printing) and fixing images, and the like.

Also, the image processing apparatus 100 has an FPGA 140 that includes a dynamic reconfiguration unit as a controller that controls the image processing apparatus 100. In this example, the FPGA 140 includes a CPU 101 that performs overall control of the operations of the image processing apparatus 100. The CPU 101 executes programs for controlling the FPGA 140, a configuration controller 130 that controls reconfiguration, and the like. It should be noted that the case in which the FPGA 140 includes the CPU 101 is merely an example, and a CPU may be provided outside of the FPGA 140.

Also, the image processing apparatus 100 has a ROM 104 and a RAM 111. The ROM 104 stores a boot program that is executed by the CPU 101, and circuit configuration information (configuration data) to be used for configuring the dynamic reconfiguration unit 131. The RAM 111 is a system work memory for the CPU 101 to perform operations, and is an image memory for temporarily storing image data. The CPU 101 can duplicate and store circuit configuration information stored in the ROM 104 to the RAM 111, and can quickly read out the circuit configuration information from the RAM 111.

The FPGA 140 includes the CPU 101, a network interface (a network I/F) 102, a printer I/F 106, a scanner I/F 108, a memory controller 110, a ROM I/F 112, an operation unit I/F 113, the configuration controller 130, the dynamic reconfiguration unit 131, a system bus 120, and an image bus 121. The CPU 101, the network I/F 102, the operation unit 103, the ROM I/F 112, the configuration controller 130, and image processing units 132A, 132B, and 132C of the dynamic reconfiguration unit 131 are connected to each other via the system bus 120. Also, the image processing units 132A, 132B, and 132C of the dynamic reconfiguration unit 131, the scanner I/F 108, and the printer I/F 106 are connected to each other via the image bus 121. The image bus 121 is used for transferring image data that is to be processed. It should be noted that the memory controller 110 is connected to both the system bus 120 and the image bus 121.

The dynamic reconfiguration unit 131 is a reconfigurable circuit whose circuit arrangement is dynamically reconfigurable (rewritable) and in which a portion of the circuit arrangement can be rewritten. In other words, while one circuit of the dynamic reconfiguration unit 131 is operating, another circuit can be reconfigured in another portion that does not overlap with the region occupied by the one circuit. The dynamic reconfiguration unit 131 has the image processing units 132A, 132B, and 132C in which logic circuits for performing various image processes can be partially reconfigured. It should be noted that although the present embodiment describes the case in which the number of image processing units that are constituted in the dynamic reconfiguration unit 131 is three, the number of image processing units is not limited to three. The configuration controller 130 controls the circuit arrangement of the dynamic reconfiguration unit 131, and reconfigures the dynamic reconfiguration unit 131 in accordance with the control performed by the CPU 101. It should be noted that the image processing units 132A, 132B, and 132C are examples of process circuits that are provided in a portion of the dynamic reconfiguration unit 131 (a reconfigurable circuit) and that perform image processes.

The CPU 101 performs overall control of the operations of the image processing apparatus 100. Also, the CPU 101 communicates with (transmits to/receives from) a generic computer (not shown) on a network via the network I/F 102. The ROM I/F 112 controls access to the ROM 104 (writing of data to the ROM 104 and reading out data from the ROM 104). Also, the CPU 101 sets parameters for the image processing units 132A, 132B, and 132C that are constituted inside the dynamic reconfiguration unit 131 via the system bus 120.

The operation unit I/F 113 functions as an interface between the system bus 120 and the operation unit 103. Image data is input from the scanner unit 109 to the scanner I/F 108. The printer I/F 106 outputs image data to the printer unit 107. The memory controller 110 controls the writing of data to the RAM 111 and the reading out of data from the RAM 111. The memory controller 110 is connected to the system bus 120 and the image bus 121. The memory controller 110 exclusively switches between access from a bus master connected to the image bus 121 to the RAM 111 and access from a bus master connected to the system bus 120 to the RAM 111.

Relationship Between Job and Image Process Function

Figure 2:
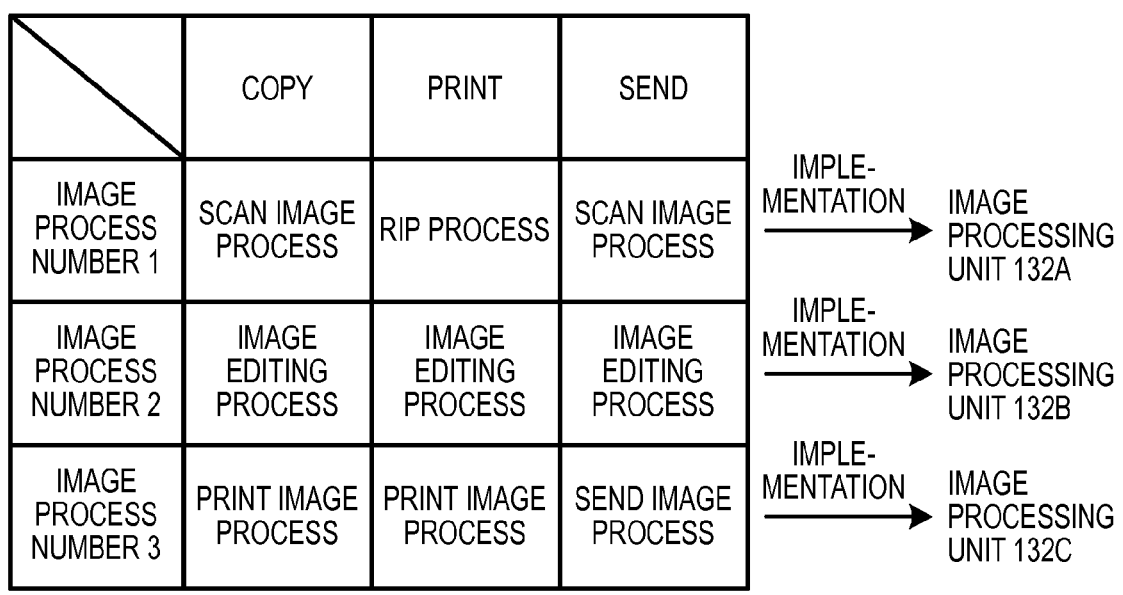
FIG. 2 is a diagram showing one example of a relationship between jobs that can be executed in an image processing apparatus according to one embodiment and the image process functions that are required in each job.

FIG. 2 is a diagram shows one example of the relationship between jobs that can be executed in the image processing apparatus 100 and the image process functions that are required in each job. The image processing apparatus 100 is capable of executing a copy job, a print job and a send job. FIG. 2 shows image process functions that are respectively required in the copy job, the print job, and the send job (in other words, processes executed in each job), and execution orders thereof. The copy job is a job for reading and duplicating a document using the scanner unit 109. The print job is a job for performing printing by the printer unit 107, based on print data transmitted from a printer driver of a PC or the like on a network. The send job is a job for transmitting image data obtained by reading a document using the scanner unit 109 to an external file server or an e-mail address.

In the copy job, a scan image process in which correction processing for a scanner is performed on image data input from the scanner unit 109 is firstly executed as an image process number 1. Next, an image editing process in which a rotation process, a scaling process, a trimming process and the like are performed on the image data is executed as an image process number 2. Finally, a print image process in which correction, resolution conversion and the like are performed on the image data output (printed) in the printer unit 107 is executed as an image process number 3.

In the print job, a raster image processor (RIP) process in which a Page Description Language (PDL) code that is included in a print job received via the network I/F 102 is rendered into a bitmap image is executed as an image process number 1. Moreover, the image editing process is executed as an image process number 2 and the print image process is executed as an image process number 3 in this order. Also, in the send job, the scan image process is executed as an image process number 1, and the image editing process is executed as an image process number 2 in this order. Finally, a send image process which includes a high compression process and the like for transmitting image data to a network is executed as an image process number 3.

In the present embodiment, as shown in FIG. 2, an image process function corresponding to the image process number 1 is implemented in the image processing unit 132A, an image process function corresponding to the image process number 2 is implemented in the image process unit 132B, and an image process function corresponding to the image process number 3 is implemented in the image processing unit 132C. In other words, circuits for executing image processes corresponding to the image process numbers 1, 2, and 3 shown in FIG. 2 are constituted in the image processing units 132A, 132B, and 132C in accordance with jobs that are to be executed in the image processing apparatus 100.

It should be noted that jobs shown in FIG. 2 are merely examples, and the jobs that can be processed by the image processing apparatus 100 are not limited to the jobs shown in FIG. 2. Also, the units of image processes are not limited to the ones shown in FIG. 2, and the processes included in each job can be divided into more specific processes.

Configuration of Image Processing Unit

Figure 3:
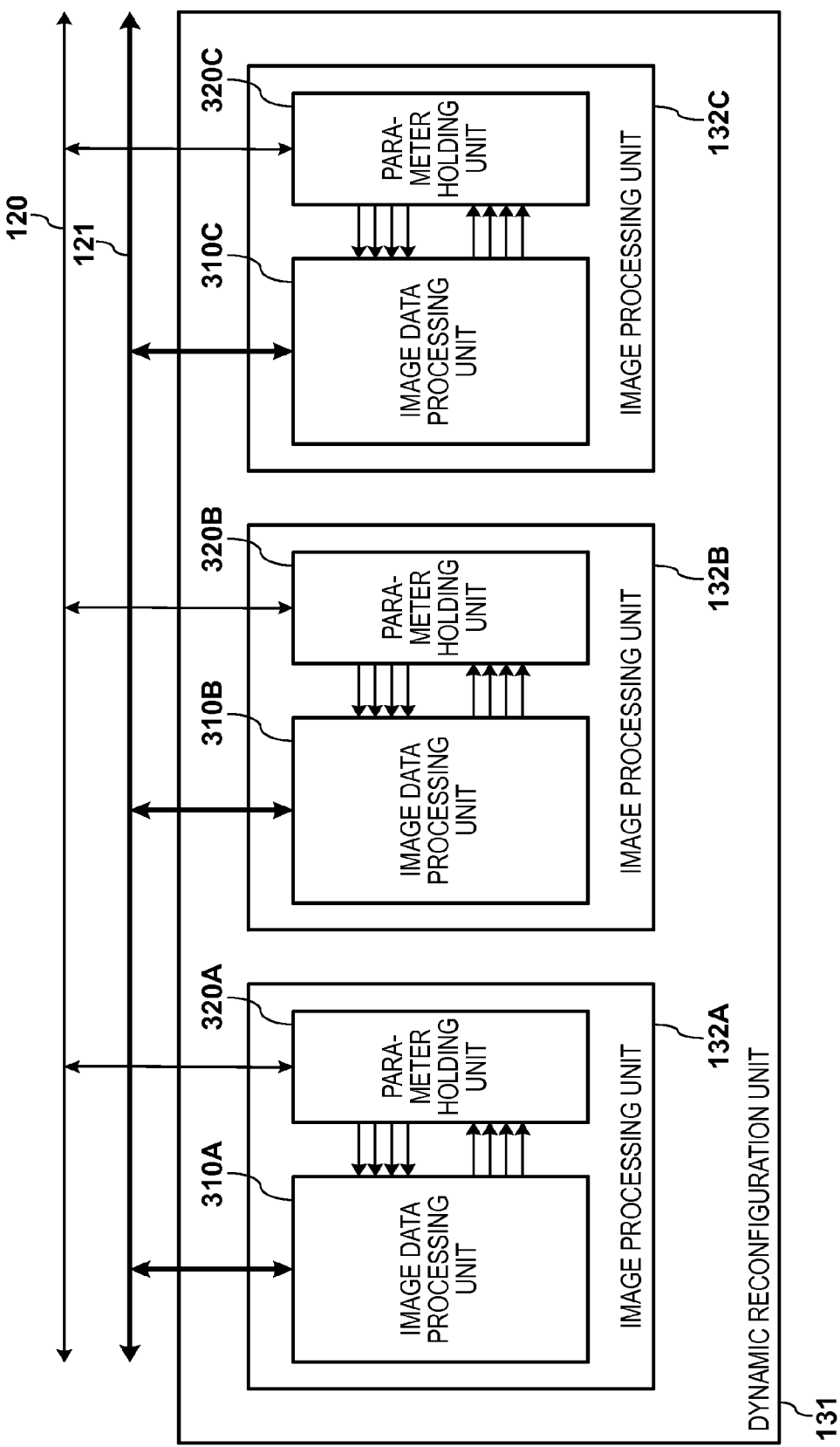
FIG. 3 is a diagram showing an example of a logic circuit arrangement of an image processing unit provided in a dynamic reconfiguration unit according to one embodiment.

FIG. 3 is a diagram showing an example of the logic circuit arrangement of the image processing units 132A, 132B, and 132C provided in the dynamic reconfiguration unit 131. The image processing units 132A, 132B, and 132C are respectively configured to have image data processing units and parameter holding units as logic circuits for executing the image processes shown in FIG. 2. In the present embodiment, the image processing unit 132A is configured to have an image data processing unit 310A and a parameter holding unit 320A. Also, the image processing unit 132B is configured to have an image data processing unit 310B and a parameter holding unit 320B, and the image processing unit 132C is configured to have an image data processing unit 310C and a parameter holding unit 320C.

The image data processing unit 310A is connected to the image bus 121, and performs an image process on image data that is received via the image bus 121. The parameter holding unit 320A is connected to the system bus 120, and holds parameters for determining operations and process content of the image data processing unit 310A. The parameters held by the parameter holding unit 320A are examples of parameters set for image processes, and are set by the CPU 101 via the system bus 120. The CPU 101 stores parameter values indicating the operations and process content of the image data processing unit 310A in the parameter holding unit 320A, and thereby sets parameters in the parameter holding unit 320A. The image data processing unit 310A performs image processes on image data in accordance with parameters held by the parameter holding unit 320A.

The parameter holding unit 320A sends the held parameter values to the image data processing unit 310A. Also, the image data processing unit 310A sends a status value indicating the status of the image data processing unit 310A to the parameter holding unit 320A. The image data processing unit 310A performs image processes on image data in accordance with parameter values sent from the parameter holding unit 320A.

It should be noted that the image processing unit 132B (the image data processing unit 310B and the parameter holding unit 320B) and the image processing unit 132C (the image data processing unit 310C and the parameter holding unit 320C) operate similarly to the image processing unit 132A.

Configuration Data

Figure 4:
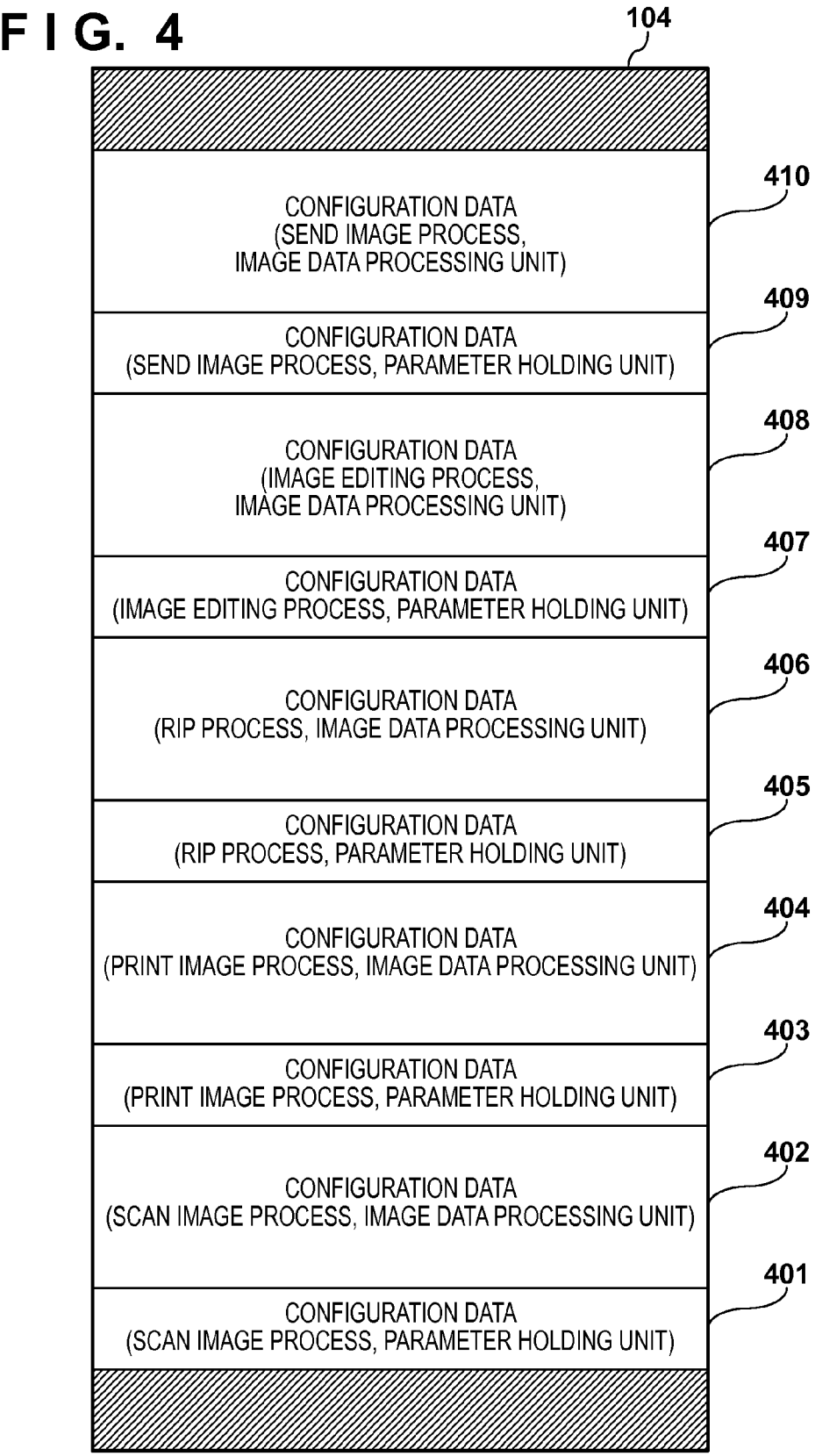
FIG. 4 is a diagram showing one example of configuration data to be stored in a ROM according to one embodiment.

FIG. 4 is a diagram showing one example of configuration data stored in the ROM 104. As described above, the image processing unit 132A, 132B, and 132C are configured to respectively have two logic circuits, namely the image data processing unit and the parameter holding unit. The ROM 104 stores configuration data 401 to 410 for respectively configuring, in the image processing units 132A, 132B, and 132C, logic circuits that realize the image process functions (execute image processes) shown in FIG. 2.

In FIG. 4, the configuration data 401, 403, 405, and 407 are data (first circuit configuration information) for reconfiguring the parameter holding units 320A, 320B, and 320C. Also, the configuration data 402, 404, 406, and 408 are data (second circuit configuration information) for reconfiguring the image data processing unit 310A, 310B, and 310C. In this manner, the ROM 104 separately stores configuration data for two logic circuits, namely the image data processing unit and the parameter holding unit. Also, the ROM 104 stores configuration data for a parameter holding unit and configuration data for an image data processing unit, in correspondence with each of a plurality of image processes (FIG. 2) that can be executed by the image processing apparatus 100.

For example, configuration data 401 is configuration data for the image data processing unit that corresponds to the scan image process. Also, configuration data 402 is configuration data for the parameter holding unit that corresponds to the scan image process. Also, configuration data 407 is configuration data for the image data processing unit that corresponds to the image editing process, and configuration data 408 is configuration data for the parameter holding unit that corresponds to the image editing process.

The image processing units 132A, 132B, and 132C can each be separately (partially) reconfigured in the dynamic reconfiguration unit 131. However, in the case of performing reconfiguration on image processing units one-by-one, parameters that are required for image processes can be set in the parameter holding units 320A, 320B, and 320C after reconfiguration of the entire image processing unit for which parameters are to be set has been completed.

In contrast, in the present embodiment, the setting of parameters can be performed at an earlier timing when the image processing units 132A, 132B, and 132C are reconfigured, and thereby image processes can be initiated sooner after reconfiguration of the image processing units. Specifically, as shown in FIG. 3, the CPU 101 divides an image processing unit that is to be reconfigured into a parameter holding unit and an image data processing unit, and controls the configuration controller 130 so as to reconfigure the image data processing unit after reconfiguring the parameter holding unit. In other words, the CPU 101 separately reconfigures the parameter holding unit and the image data processing unit instead of reconfiguring the entire image processing unit at a single time, and thereby first completes the reconfiguration of the parameter holding unit. Accordingly, before the completion of reconfiguration of the image data processing unit (in other words, the entire image data processing unit), parameters can be set in the parameter holding unit whose reconfiguration has been completed first. It should be noted that the setting of parameters in the parameter holding unit can be executed in parallel with reconfiguration of the image data processing unit after reconfiguration of the parameter holding unit has been completed.

Also, with the present embodiment, a plurality of image processing units 132A, 132B, and 132C are reconfigured as shown in FIG. 2 such that required image processes (the scan image process, the print image process, the RIP process, the image editing process, and/or the send image process) can be executed in accordance with jobs executed in the image processing apparatus 100. In this case, the CPU 101 reconfigures a plurality of image data processing units 310A, 310B, and 310C after reconfiguring a plurality of parameter holding units 320A, 320B, and 320C corresponding to a plurality of image processing units 132A, 132B, and 132C. Accordingly, at the time of executing a job in the image processing apparatus 100, the setting of parameters in the parameter holding units 320A, 320B, and 320C can be initiated before the completion of reconfiguration of the image data processing units 310A, 310B, and 310C. As a results, an image process in each of the image data processing units 310A, 310B, and 310C can be initiated sooner.

Procedure of Reconfiguration of Image Processing Unit

Figure 5:
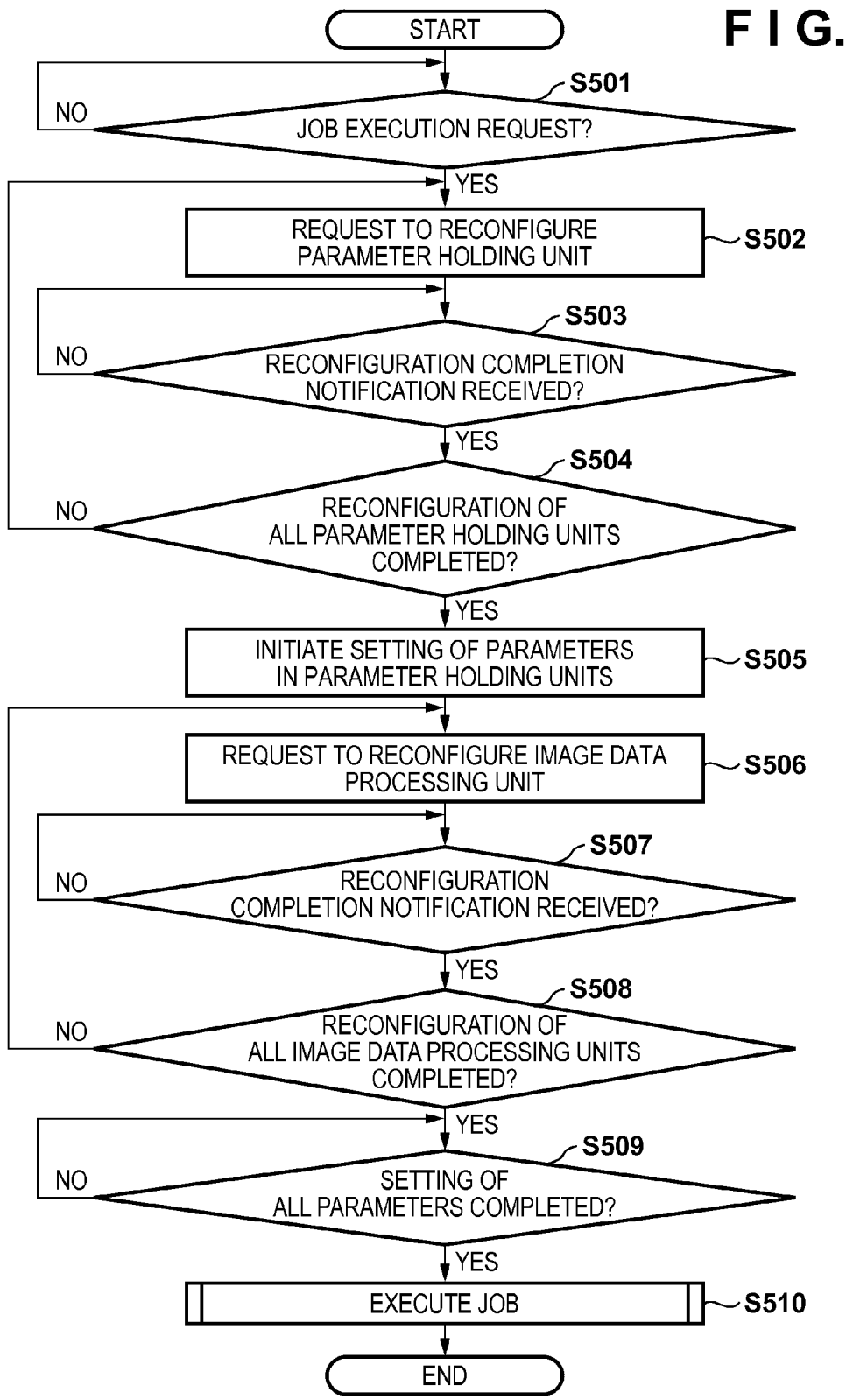
FIG. 5 is a flowchart indicating a process procedure when a job is executed using a dynamic reconfiguration unit according to one embodiment.

FIG. 5 is a flowchart indicating a process procedure when a job is executed using the dynamic reconfiguration unit 131 in the image processing apparatus 100 according to the present embodiment. It should be noted that each process indicated in this flowchart is realized by the CPU 101 reading control programs stored in advance in the ROM 104 or the like to the RAM 111 and executing the read programs. Hereinafter, the case where a job that is to be executed is a copy job will be described as an example.

The CPU 101 determines in step S501 whether or not a request to execute a job has been issued, based on information received from the operation unit 103, information received via the network I/F 102 or the like, and moves the processing to step S502 when an execution request is issued. Here, in the case where a user gives an instruction for copy execution via the operation unit 103, the CPU 101 determines that a request to execute a copy job has been issued.

Next, in step S502, the CPU 101 issues a request to the configuration controller 130 such that the parameter holding units 320A, 320B, and 320C are reconfigured in this order for each image process (FIG. 2) that is required for the job to be executed. Specifically, the CPU 101 transmits, to the configuration controller 130 via the system bus 120, a reconfiguration request including information related to configuration data that corresponds to each image process (FIG. 2) that is required for the job to be executed. In the case of a copy job, the CPU 101 first issues a request to the configuration controller 130 such that the parameter holding unit 320A is reconfigured using the configuration data 401 for the parameter holding unit that corresponds to the scan image process. The CPU 101 then waits in step S503 until a notification of completion of reconfiguration is received from the configuration controller 130, and moves the processing to step S504 upon receiving the reconfiguration completion notification.

Processing of Configuration Controller 130

Figure 6:
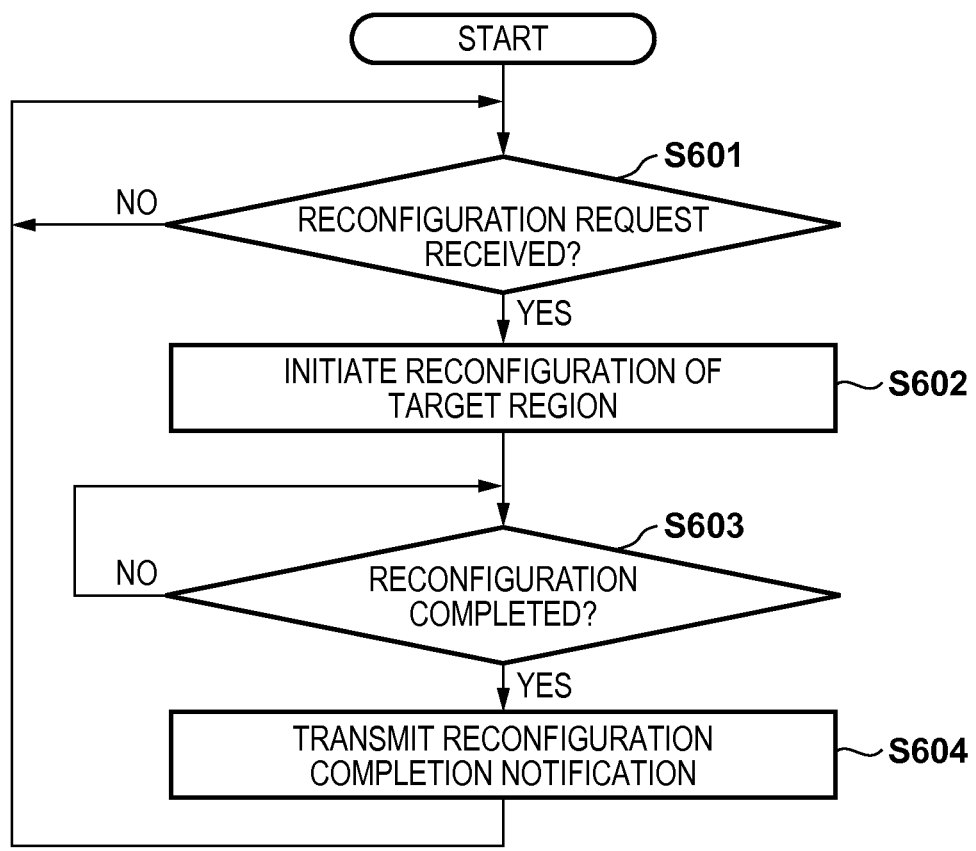
FIG. 6 is a flowchart indicating a procedure of reconfiguration of a dynamic reconfiguration unit according to one embodiment.

Here, FIG. 6 is a flowchart indicating a procedure of reconfiguring the dynamic reconfiguration unit 131 that is executed by the configuration controller 130, in response to the request issued from the CPU 101. The configuration controller 130 waits in step S601 until a request to reconfigure the dynamic reconfiguration unit 131 is received, and moves the processing to step S602 upon receiving the reconfiguration request. In step S602, the configuration controller 130 reads out configuration data stored in the ROM 104 in accordance with the reconfiguration request issued from the CPU 101, and writes the data to a region, of the dynamic reconfiguration unit 131, that is to be reconfigured. In this manner, the configuration controller 130 reconfigures a target region of the dynamic reconfiguration unit 131.

Thereafter, the configuration controller 130 waits in step S603 until reconfiguration of the target region of the dynamic reconfiguration unit 131 has been completed. When reconfiguration of the target region has been completed, the configuration controller 130 transmits in step S604 a notification (reconfiguration completion notification) indicating that the reconfiguration in accordance with the reconfiguration request has been completed to the CPU 101 via the system bus 120, and returns the processing to step S601. Thereafter, the configuration controller 130 is in a wait state in step S601 until reception of the next reconfiguration request from the CPU 101.

In the case of a copy job, upon receiving a request to reconfigure the parameter holding unit 320A, the configuration controller 130 reads out configuration data 401 for the parameter holding unit that corresponds to the scan image process from the ROM 104, in accordance with the reconfiguration request. Furthermore, the configuration controller 130 writes the readout configuration data 401 to the parameter holding unit 320A, and thereby reconfigures the parameter holding unit 320A. When reconfiguration of the parameter holding unit 320A has been completed, a notification indicating that reconfiguration of the parameter holding unit 320A has been completed is transmitted to the CPU 101.

Returning to the description of the flowchart of FIG. 5, upon receiving a reconfiguration completion notification from the configuration controller 130 in step S503, the CPU 101 moves the processing to step S504. The CPU 101 determines in step S504 whether or not reconfiguration of all of the parameter holding units 320A, 320B, and 320C has been completed, and in the case of determining that the reconfiguration has not been completed, the CPU 101 moves the processing to step S502, and reconfigures the next parameter holding unit. In the case of a copy job, in steps S502 to S504, subsequently to the reconfiguration of the parameter holding unit 320A, the parameter holding unit 320B is reconfigured using configuration data 407 for the parameter holding unit that corresponds to the image editing process. Moreover, subsequently to the reconfiguration of the parameter holding unit 320B, the parameter holding unit 320C is reconfigured using configuration data 403 for the parameter holding unit that corresponds to the print image process. In the case where the CPU 101 determines in step S504 that reconfiguration of all of the parameter holding units 320A, 320B, and 320C has been completed, the CPU 101 moves the processing to step S505.

Next, in step S505, the CPU 101 initiates the setting of parameters required for executing the job in the parameter holding units 320A, 320B, and 320C, via the system bus 120. Furthermore, in step S506, the CPU 101 issues a request to the configuration controller 130 such that the image data processing units 310A, 310B, and 310C are reconfigured in this order for each image process (FIG. 2) that is required for the job to be executed. It should be noted that parameters are set in the parameter holding units 320A, 320B, and 320C in parallel with reconfiguration of the image data processing units 310A, 310B, and 310C in steps S506 to S508.

In step S506, the CPU 101 transmits, to the configuration controller 130 via the system bus 120, a reconfiguration request that includes information related to configuration data that corresponds to each image process (FIG. 2) required for a job to be executed. In the case of a copy job, the CPU 101 first issues a request to the configuration controller 130 such that the image data processing unit 310A is reconfigured using configuration data 402 for the image data processing unit that corresponds to the scan image process. The CPU 101 then waits in step S507 until a reconfiguration completion notification is received from the configuration controller 130, and moves the processing to step S508 upon receiving the reconfiguration completion notification.

Reconfiguration of the image data processing unit 310A is executed by the configuration controller 130 in accordance with the procedure shown in FIG. 6. In the case of a copy job, upon receiving a request to reconfigure the image data processing unit 310A, the configuration controller 130 reads out from the ROM 104 the configuration data 402 for the image data processing unit that corresponds to the scan image process, in accordance with the reconfiguration request. Furthermore, the configuration controller 130 writes the readout configuration data 402 to the image data processing unit 310A, and thereby reconfigures the image data processing unit 310A. When reconfiguration of the image data processing unit 310A has been completed, the configuration controller 130 transmits, to the CPU 101, a notification indicating that reconfiguration of the image data processing unit 310A has been completed.

Next, upon receiving the reconfiguration completion notification from the configuration controller 130 in step S507, the CPU 101 then determines in step S508 whether or not the reconfiguration of all of the image data processing units 310A, 310B, and 310C has been completed, and in the case where the CPU 101 determines that reconfiguration has not been completed, the CPU 101 returns the processing to step S506, and reconfigures the next image data processing unit. In the case of a copy job, in steps S506 to S508, subsequently to the reconfiguration of the image data processing unit 310A, the image data processing unit 310B is reconfigured using configuration data 408 for the image data processing unit that corresponds to the image editing process. Furthermore, subsequently to the reconfiguration of the image data processing unit 310B, the image data processing unit 310C is reconfigured using configuration data 404 for the image data processing unit that corresponds to the print image process. In the case of determining in step S508 that the reconfiguration of all of the image data processing units 310A, 310B, and 310C has been completed, the CPU 101 moves the processing to step S509.

In step S509, the CPU 101 determines whether or not the setting of parameters in the parameter holding units 320A, 320B, and 320C has been completed, which is executed in parallel with reconfiguration of the image data processing units 310A, 310B, and 310C in steps S506 to S508. In the case of determining that the setting of parameters in all of the parameter holding units 320A, 320B, and 320C has been completed, the CPU 101 moves the processing to step S510. On the other hand, in the case of determining that the setting of parameters has not been completed, the CPU 101 waits until the setting has been completed.

Figure 7:
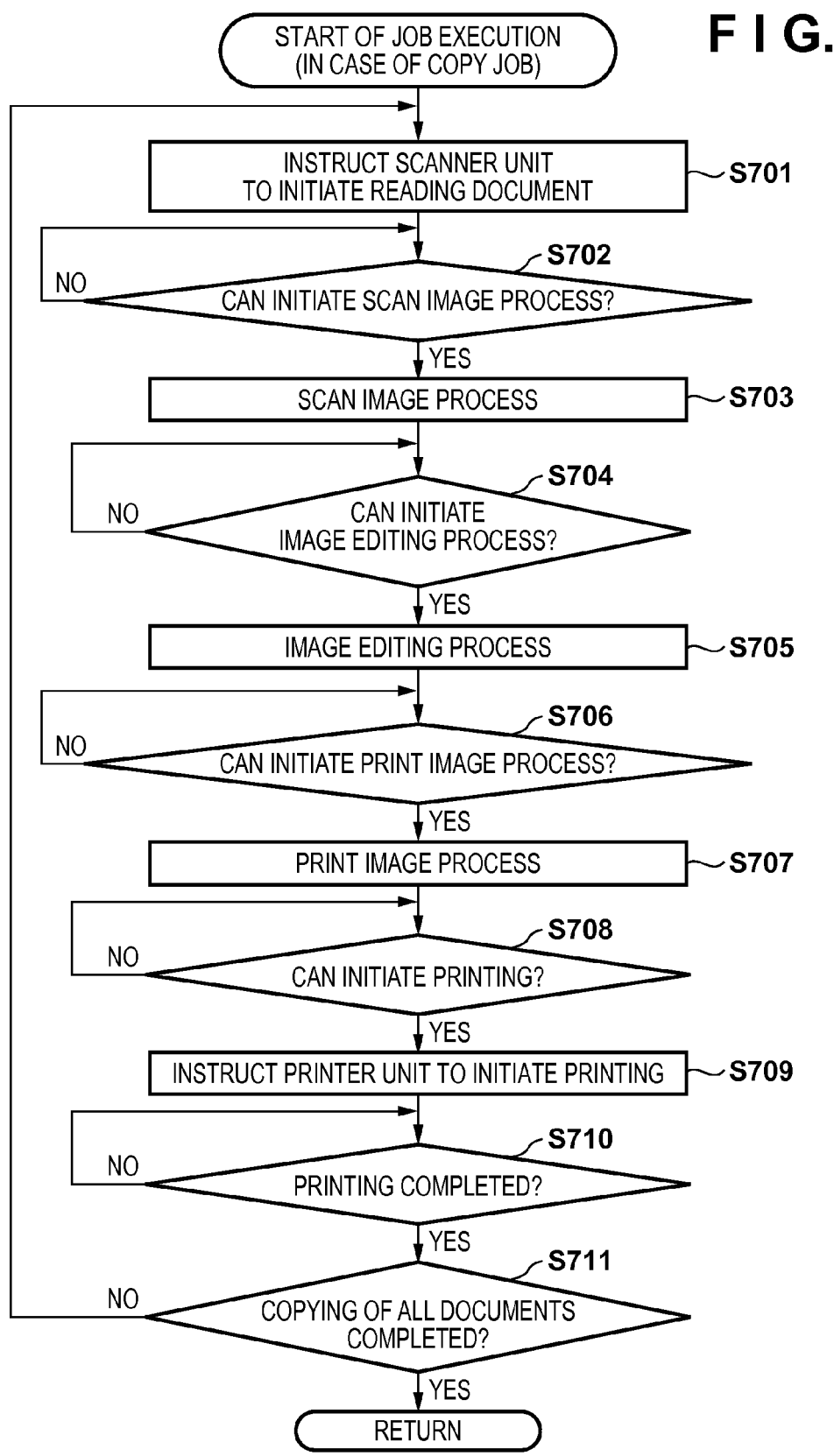
FIG. 7 is a flowchart indicating a procedure of execution of a copy job using a dynamic reconfiguration unit according to one embodiment.

In step S510, the CPU 101 executes the job using the dynamic reconfiguration unit 131 reconfigured for image processes required for execution of the job (here, a copy job). FIG. 7 is a flowchart indicating the procedure of executing the job (the copy job) in step S510. First, in step S701, the CPU 101 instructs the scanner unit 109 to initiate the reading of a document. Image data obtained by the scanner unit 109 reading a document is input via the scanner I/F 108, and is stored in the RAM 111 via the image bus 121 and the memory controller 110.

Thereafter, the CPU 101 determines in step S702 whether or not the image processing unit 132A can initiate the scan image process, and moves the processing to step S703 upon determining that the image processing unit 132A can initiate the scan image process. Here, in the case where a predetermined amount of image data that is required for the image processing unit 132A to perform the scan image process is stored in the RAM 111, the CPU 101 determines that the scan image process can be initiated. In step S703, the CPU 101 transmits an instruction to initiate the scan image process to the image processing unit 132A, and thereby causes the image processing unit 132A to perform the scan image process on the image data stored in the RAM 111. In accordance with the instruction given from the CPU 101, the image processing unit 132A reads out the image data stored in the RAM 111, performs the scan image process, and then again stores the image data resulting from the image process in the RAM 111.

Next, the CPU 101 determines in step S704 whether or not the image processing unit 132B can initiate the image editing process, and moves the processing to step S705 upon determining that the image editing process can be initiated. Herein, in the case where a predetermined amount of image data that is required for the image processing unit 132B to perform the image editing process and on which the image processing unit 132A has performed the image process is stored in the RAM 111, the CPU 101 determines that the image editing process can be initiated. In step S705, the CPU 101 transmits an instruction to initiate the image editing process to the image processing unit 132B, and thereby causes the image processing unit 132B to perform the image editing process on the image data stored in the RAM 111. In accordance with the instruction given from the CPU 101, the image processing unit 132B reads out the image data stored in the RAM 111, performs the scan image process, and then again stores the image data resulting from the image process in the RAM 111.

Next, the CPU 101 determines in step S706 whether or not the image processing unit 132C can initiate the print image process, and moves the processing to step S707 upon determining that the print image process can be initiated. Here, in the case where a predetermined amount of image data that is required for the image processing unit 132C to perform the print image process and on which the image processing unit 132B performed the image process is stored in the RAM 111, the CPU 101 determines that the print image process can be initiated. In step S707, the CPU 101 transmits an instruction to initiate the print image process to the image processing unit 132C, and thereby causes the image processing unit 132C to execute the print image process on the image data stored in the RAM 111. In accordance with the instruction given from the CPU 101, the image processing unit 132C reads out the image data stored in the RAM 111, performs the print image process, and then again stores the image data resulting from the image process in the RAM 111.

Next, the CPU 101 determines in step S708 whether or not the printer unit 107 can initiate printing based on the image data, and moves the processing to step S709 upon determining that the printing can be initiated. Here, in the case where a predetermined amount of image data that is required for the printer unit 107 to perform the printing and on which the image processing unit 132C performed the image process, is stored in the RAM 111, the CPU 101 determines that the printing can be initiated. In step S709, the CPU 101 transmits a printing initiation instruction to the printer unit 107 via the printer I/F 106, and initiates the transfer of the image data stored in the RAM 111 to the printer unit 107.

Thereafter, the CPU 101 determines in step S710 whether or not the printer unit 107 has completed performing the printing, and moves the processing to step S711 upon determining that the printing has been completed. In step S711, the CPU 101 determines whether or not the copying of all of the documents that are to be copied has been completed. In the case where a document that is to be copied remains, the CPU 101 returns the processing to step S701 in order to initiate the copying of the next document, whereas the CPU 101 ends the execution of the copy job upon determining that the copying of all of the documents has been completed.

In this manner, in the present embodiment, in the case of reconfiguring the dynamic reconfiguration unit 131 (image processing units 132A, 132B, and 132C), the CPU 101 first reconfigures the parameter holding units of the image processing units instead of executing reconfiguration of the image processing units one-by-one in order. Furthermore, after reconfiguration of the parameter holding units of the image processing units has been completed, the CPU 101 reconfigures the image data processing units of the image processing units. Accordingly, compared with the case in which reconfiguration is performed on image processing units one-by-one in order, parameters can be set in parameter holding units sooner. As a result, the dynamic reconfiguration unit 131 can initiate an image process sooner. For example, the dynamic reconfiguration unit 131 can initiate an image process at an earlier timing than in the case where parameters are set in the parameter holding units after reconfiguration of all of the image processing units 132A, 132B, and 132C has been completed.

Also, the CPU 101, as shown in FIG. 5, may execute the setting of parameters in the parameter holding units of the image processing units in parallel with reconfiguration of the image data processing units of the image processing units. Accordingly, the setting of parameters in the parameter holding units can be completed sooner, and it is possible to allow the dynamic reconfiguration unit 131 to initiate an image process even sooner.

Example of Timing when Image Processing Units are Reconfigured and Parameters are Set FIGS. 8A to 8D are timing charts indicating an example of timing when the dynamic reconfiguration unit 131 is reconfigured and parameters are set. It should be noted that the image processing units 132A, 132B, and 132C are indicated as image processing units A, B, and C in FIGS. 8A to 8D. FIGS. 8A and 8C show cases in which the image processing units A, B, and C (the image processing units 132A, 132B, and 132C) are reconfigured altogether at the same time, as comparative examples. FIGS. 8B and 8D show cases in which the image processing units A, B, and C are divided into the parameter holding units A, B, and C (parameter holding units 320A, 320B, and 320C) and image data processing units A, B, and C (image data processing units 310A, 310B, and 310C), and reconfigured. Also, FIGS. 8A to 8D show cases in which the circuit scales of the parameter setting units A, B, and C are smaller than those of the image data processing unit A, B, and C, and therefore it takes a shorter time for reconfiguration of the parameter setting units A, B, and C than for reconfiguration of the image data processing units A, B, and C.

In the comparative example shown in FIG. 8A, the image processing units A, B, and C of the dynamic reconfiguration unit 131 are reconfigured altogether at the same time. The time required for this reconfiguration is substantially proportional to the circuit scales of the image processing units A, B, and C, in other words, the data amount of the configuration data (circuit configuration information) for the image processing units A, B, and C. In this comparative example, when reconfiguration of all of the image processing units A, B, and C has been completed, parameters are set for the image processing units A, B, and C, and an image process is initiated. Here, assuming that the time required for reconfiguration of the image processing units A, B, and C is Tr, and the time required for setting parameters for the image processing units A, B, and C is Ts, it takes Tr+Ts from initiation of reconfiguration of the dynamic reconfiguration unit 131 until the image process is initiated.

Meanwhile, in the present embodiment, as shown in FIG. 8B, the parameter holding units of the image processing units A, B, and C are first reconfigured (time required is Trp). When reconfiguration of the parameter holding units A, B, and C has been completed, parameters can be set for the image processing units A, B, and C. Thus, parameters are set in the parameter holding units A, B, and C in parallel with reconfiguration of the image data processing units A, B, and C. It should be noted that the examples of FIGS. 8A and 8B show cases in which Ts, which is the time required for setting parameters in the parameter holding units A, B, and C, is shorter than Trd, which is the time required for reconfiguring the image data processing units A, B, and C.

As described above, the time required for reconfiguration of the dynamic reconfiguration unit 131 is substantially proportional to the circuit scale (data amount of the configuration data) of the region that is to be reconfigured. Therefore, the total of Trp, which is the time required for reconfiguring the parameter holding units, and Trd, which is the time required for reconfiguring the image data processing units, is substantially equal to Tr, which is the time required for reconfiguring all of the image processing units. Thus, in the present embodiment, an image process is initiated sooner after the dynamic reconfiguration unit 131 is reconfigured by an amount of time that corresponds to Ts, which is the time required for setting parameters for the image processing units, compared to the comparative example shown in FIG. 8A. Moreover, the time required for an image process to be completed can also be made shorter by the same amount of time.

Also, the examples of FIGS. 8C and 8D show cases in which Ts, which is the time required for setting parameters in the parameter holding units A, B, and C, is longer than Trd, which is the time required for reconfiguring the image data processing units A, B, and C. In this case, in the present embodiment, as shown in FIG. 8C, it takes Trp+Ts from initiation of the reconfiguration of the dynamic reconfiguration unit 131 until the image process is initiated. However, compared with the comparative example shown in FIG. 8C, the image process is initiated sooner after the dynamic reconfiguration unit 131 is reconfigured.

It should be noted that the above embodiment describes an example in which parameters are set in each parameter holding unit after reconfiguration of all of the parameter holding units has been completed. However, in response to the completion of reconfiguration of each parameter holding unit, parameters may be set in order in the parameter holding units for which reconfiguration has been completed.

According to the above-described embodiment, in an image processing apparatus that performs an image process using circuits (image processing units) on which dynamic partial reconfiguration can be performed, the image processing units are divided into parameter setting units and image data processing units, and the parameter setting units are reconfigured before the image data processing units are reconfigured. Furthermore, parameters are set for the image processing units (the parameter setting units) at earlier timing than in the case where the setting of parameters is performed after reconfiguration of all of the image processing units has been completed. Accordingly, an image process can be initiated sooner after the image processing unit is reconfigured.

OTHER EMBODIMENTS

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041941, filed Mar. 4, 2014, which is hereby incorporated by reference herein in its entirety.

What is claimed is:

1. An image processing apparatus comprising:
a reconfigurable circuit on which a plurality of logic circuits are configured dynamically;
a storage unit configured to store first circuit configuration information for configuring a parameter holding circuit which holds a parameter and second circuit configuration information for configuring a data processing circuit which performs image processing on image data using the parameter held by the parameter holding circuit;
a configuration controller configured to configure the parameter holding circuit on the reconfigurable circuit using the first circuit configuration information stored in the storage unit, and configure the data processing circuit on the reconfigurable circuit using the second circuit configuration information stored in the storage unit; and
a setting controller configured to set a parameter in the parameter holding circuit for which the configuration has been completed, wherein the parameter is held by the parameter holding circuit so as to be used for the image processing by the data processing apparatus,
wherein the configuration controller initiates the configuration of the parameter holding circuit and initiates, after completing the configuration of the parameter holding circuit, the configuration of the data processing circuit, wherein the setting controller sets the parameter in the parameter holding circuit while the configuration controller executes the configuration of the data processing circuit, and wherein the configuration controller is implemented using at least one CPU and a memory.

2. The image processing apparatus according to claim 1, wherein the storage unit stores the first circuit configuration information and the second circuit configuration information in correspondence with each of a plurality of image processes that can be executed by the image processing apparatus, and the configuration controller performs control so as to configure the parameter holding circuit and the data processing circuit respectively using the first circuit configuration information and the second circuit configuration information that are stored in the storage unit and that correspond to an image process that is to be executed.

3. The image processing apparatus according to claim 1, wherein when performing control for reconfiguration, on the reconfigurable circuit, of a plurality of processing circuits that respectively perform image processes required for executing a job in the image processing apparatus, the configuration controller configures a plurality of data processing circuits that correspond to the plurality of processing circuits after a plurality of parameter holding circuits that correspond to the plurality of processing circuits have been reconfigured.

4. The image processing apparatus according to claim 3, wherein during execution of configuration of the plurality of data processing circuits after configuration of the plurality of parameter holding circuits has been completed, the setting controller sets parameters for image processes in the data processing circuits, in the parameter holding circuits that correspond to the data processing circuits in order.

5. The image processing apparatus according to claim 1, further comprising:

a reconfiguration unit configured to configure the reconfigurable circuit in accordance with control performed by the configuration controller, wherein when the configuration of the parameter holding circuit in the reconfigurable circuit has been completed, the reconfiguration unit gives the setting controller a notification indicating that the configuration of the parameter holding circuit has been completed, and the setting controller initiates setting of the parameter in the parameter holding circuit in response to the notification given from the reconfiguration unit.

6. The image processing apparatus according to claim 5, wherein in a case where the reconfiguration unit performs reconfiguration, on the reconfigurable circuit, of a plurality of processing circuits that respectively perform image processes required for executing a job in the image processing apparatus, the setting controller initiates setting of parameters in a plurality of parameter holding circuits that correspond to the plurality of processing circuits, in response to reception, from the reconfiguration unit, of the notification for all of the plurality of parameter holding circuits.

7. A method for controlling an image processing apparatus which includes a reconfigurable circuit on which a plurality of logic circuits are configured dynamically and a memory configured to store first circuit configuration information for configuring a parameter holding circuit which holds a parameter and second circuit configuration information for configuring a data processing circuit which performs image processing on image data using the parameter held by the parameter holding circuit, the method comprising:

initiating a configuration of the parameter holding circuit on the reconfigurable circuit using the first circuit configuration information stored in the memory;

initiating, after the configuration of the parameter holding circuit is completed, the configuration of the data processing circuit on the reconfigurable circuit using the second circuit configuration information stored in the memory; and setting a parameter in the parameter holding circuit for which the configuration has been completed while executing the configuration of the data processing circuit, wherein the parameter is held by the parameter holding circuit so as to be used for the image processing by the data processing apparatus.

8. A non-transitory computer-readable storage medium storing a computer program for causing a computer to execute steps of a method for controlling an image processing apparatus which includes a reconfigurable circuit on which a plurality of logic circuits are configured dynamically and a memory configured to store first circuit configuration information for configuring a parameter holding circuit which holds a parameter and second circuit configuration information for configuring a data processing circuit which performs image processing on image data using the parameter held by the parameter holding circuit, the method comprising:

initiating a configuration of the parameter holding circuit on the reconfigurable circuit using the first circuit configuration information stored in the memory;

initiating, after the configuration of the parameter holding circuit is completed, the configuration of the data processing circuit on the reconfigurable circuit using the second circuit configuration information stored in the memory; and setting a parameter in the parameter holding circuit for which the configuration has been completed while executing the configuration of the data processing circuit, wherein the parameter is held by the parameter holding circuit so as to be used for the image processing by the data processing apparatus.

* * * * *